(12) United States Patent
Smith (10) Patent No.: US 6,595,546 B2
(45) Date of Patent: Jul. 22, 2003

(54) MODULAR AIRBAG INFLATOR SYSTEM (75) Inventor: Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/872,108

(22) Filed: Jun. 1, 2001

(65) Prior Publication Data

US 2002/0180193 A1 Dec. 5, 2002

(51) Int. Cl.[7] .................. B60R 21/22; B60R 21/26; B60R 21/28
(52) U.S. Cl. ................ 280/736; 280/730.2; 280/740; 280/741; 280/742
(58) Field of Search .................. 280/741, 730.2, 280/736, 740–742; 285/235, 236, 256

(56) References Cited

U.S. PATENT DOCUMENTS

| | | | | | |
|---|---|---|---|---|---|
| 1,153,002 A | * | 9/1915 | Wright | ................ | 285/235 |
| 2,084,761 A | * | 6/1937 | Bradley | ................ | 285/236 |
| 5,398,976 A | * | 3/1995 | Webb | ................ | 285/236 |
| 5,961,157 A | * | 10/1999 | Baron et al. | ................ | 285/256 |
| 6,217,060 B1 | * | 4/2001 | Mangold et al. | ................ | 280/730.2 |
| 6,237,940 B1 | * | 5/2001 | Shirk et al. | ................ | 280/730.2 |
| 6,296,274 B1 | * | 10/2001 | Stevens et al. | ................ | 280/741 |

* cited by examiner

*Primary Examiner*—Kevin Hurley
*Assistant Examiner*—Matt Luby
(74) *Attorney, Agent, or Firm*—Sally J. Brown; James D. Erickson (57) ABSTRACT

A modular inflator system is disclosed that allows standardized inflator sections to be connected to assemble an airbag inflator. The modular inflator also allows the inflator to bend to follow the contour of a vehicle roof. The system includes one or more inflator sections, and a connector. The connector may be flexible to allow the modular inflator to be installed along a curve vehicle roof rail.

29 Claims, 6 Drawing Sheets

MODULAR AIRBAG INFLATOR SYSTEM

BACKGROUND OF THE INVENTION

1. The Field of the Invention

The present invention relates to airbag inflation systems in motor vehicles. More specifically, the invention relates to an airbag diffusion system for diffusing inflation gases exiting a curtain airbag inflator.

2. Technical Background

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one or more airbag modules. The ECU is usually installed in the middle of an automobile, between the passenger and engine compartments. If the vehicle has a driver airbag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 58 thousandths of a second and deflated within two tenths of a second.

An airbag cover, also called a trim cover panel, covers a compartment containing the airbag module and may reside on a steering wheel, dashboard, vehicle door, along a vehicle roof rail, vehicle wall, or beneath the dash board. The airbag cover is typically made of a rigid plastic and may be forced open by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant between the upper torso of an occupant and the windshield or instrument panel. Conventional airbags, such as driver's or passenger airbags (hereinafter referenced as the "primary airbag"), protect the occupant's upper torso and head from colliding with a windshield or instrument panel.

Airbag technology has advanced to include airbag apparatuses which protect occupants during a side impact, or roll-over accident. Airbags are used in other areas of the vehicle as well. Knee airbags exist to position and stop movement of an occupants knees and legs. Shoulder restraint airbags exist to push the occupant back into the seat to prevent injury from slack which may exist in the shoulder restraint.

Recent technological advances and uses for airbags has greatly increased their use and application. These airbag applications are common in that they generally include an inflator. The inflator, once triggered, uses compressed gas, solid fuel, or their combination to produce rapidly expanding gas to inflate the airbag. The inflator may be installed within the airbag, or otherwise operably connected to the airbag such that gas generated by the inflator inflates the airbag during an accident.

Airbags which inflate between the occupant and a side of the vehicle are known as curtain airbags. The curtain airbag inflates and descends to cover a vehicle window or side-wall like a curtain. Curtain airbags are becoming more popular. In side impact accidents the occupant may be thrown against the windows, doors and side-walls of the vehicle. The curtain airbag may protect an occupant from impact with a side window, flying shards of glass, side interior components, and other projectiles. The curtain airbag may also help to keep the occupant inside the vehicle during a roll-over accident.

Generally, the curtain airbag is attached to a long thin frame member which runs along a side of the roof of the vehicle. Often due to window size and visibility requirements, the curtain airbag apparatus has a long thin shape corresponding to the frame member. The curtain airbag inflates and descends from the frame member to cover a majority of the area between the occupant and the side of the vehicle interior.

The size requirements placed on the curtain airbag apparatus are reflected in the inflator installed within the textile airbag. The inflator may be generally long and thin in shape. The inflator is also generally rigid such that inflation gas is properly directed through the inflator and out into the airbag through exit ports in the inflator. The inflator is generally one of the few rigid components of the curtain airbag apparatus. Therefore, the size of the inflator generally dictates the size of the curtain airbag apparatus.

To provide sufficient inflation gas and to fill the airbag in the desired manner, a curtain airbag inflator generally extends a significant portion of the length of the airbag at a central location within the airbag. Exit ports disposed along the length of the inflator fill the airbag in a desirable manner. The central location and length of the inflator provides for quick and even inflation of the airbag.

As mentioned above, the curtain airbag apparatus is generally mounted to a side roof frame member (herein referred to as a 'roof rail'). The roof rail is generally shaped to follow the contour of the vehicle roof. Generally, due to aesthetic and aerodynamic factors the vehicle roof rail is curved to some degree. This requires that the curtain airbag apparatus and its components also curve to follow the contour of the vehicle roof.

Conventionally, a curtain airbag apparatus is designed and sized to fit properly within a particular make and/or model of vehicle. The confined installation area of the roof rail for the curtain airbag apparatus requires that differences between roof contours of a particular model or make of vehicle require a different shaped and sized curtain airbag apparatus. The different shaped and sized curtain airbag apparatus requires that the inflator be fabricated to different sizes. Fabricating inflators of different sizes requires downtime and re-tooling to adjust fabrication machines to produce the different size inflators.

Generally, the cross-sectional shape of the inflator is not changed to accommodate differences in roof rails between vehicles. The inflator is preferably cylindrical in shape.

Inflators are generally made of metal. The cylindrical shape is simple to form. A cylindrical shape is preferable because ignition of gas generant within the inflator causes the inflation gas to expand in all directions. A cylindrical shape helps guide the inflation gas evenly through the inflator and out the exit ports.

The width of the roof rail generally has minimum requirements which are set to ensure vehicle structural integrity and safety. Therefore, the diameter of the cylindrical inflator generally remains unchanged. Alternatively, where a wider roof rail is used the diameter of the inflator may be increased.

Therefore, in order for the curtain airbag apparatus to properly function on a wide variety of vehicles having various roof contours, the designers conventionally are limited to changing the length of the curtain airbag apparatus which varies the length of the inflator. This may result in a plurality of curtain airbag apparatuses installed on one side of the vehicle. Additionally, each curtain airbag may require a different length inflator. As indicated above, this increases fabrication costs.

Accordingly, it would be an advancement in the art to provide a modular curtain airbag inflator which is comprised of modular sections. It would be a further advancement to provide a modular curtain airbag inflator which allows the modular sections to be connected to create different length curtain airbag inflators. Additionally, it would be an advancement in the art to provide a modular curtain airbag inflator which curves to follow a contour of a vehicle roof. The present invention provides these advancements in a novel and useful way.

BRIEF SUMMARY OF THE INVENTION

The apparatus of the present invention has been developed in response to the present state of the art, and in particular, in response to the problems and needs in the art that have not yet been fully solved by currently available curtain airbag inflators. Thus, the present invention provides a modular curtain airbag inflator which allows various inflator lengths to be fashioned from a few modular sections, curves to follow a desired installation contour, and reduces the need for multiple curtain airbag inflators.

In one embodiment, the modular curtain airbag inflator includes at least two inflator sections. Preferably, the inflator sections comprise rigid metal cylindrical casings. The inflator sections contain gas generant disposed within an internal gas passage way. A first inflator section is connected to a gas generant initiator at one end. The first inflator section is connected to a first connector at the other end. The first connector is connected to a flexible hose which is connected to an end of a second inflator section by a second connector. The second section is connected to a stop that seals off the internal gas passage way.

The flexible hose and connectors continue the internal gas passage way such that inflation gas generated in the first inflator section may travel through the internal gas passage way to the second inflator section. Within the second inflator section, the inflation gas ignites gas generant to create more inflation gas and continues traveling down the internal gas passage way of the second inflator section.

In an alternative embodiment, the modular airbag inflator includes a supplemental inflator attached to an end opposite the end attached to an initiator. The modular airbag inflator is configured to initiate the supplemental inflator subsequent to igniting gas generant within previous inflator sections. The supplemental inflator is configured to add inflation gas to a curtain airbag such that a desirable inflation level is maintained over an extended period.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention can be better understood with reference to the drawings where like parts are designated with like numerals throughout.

Figure 1:
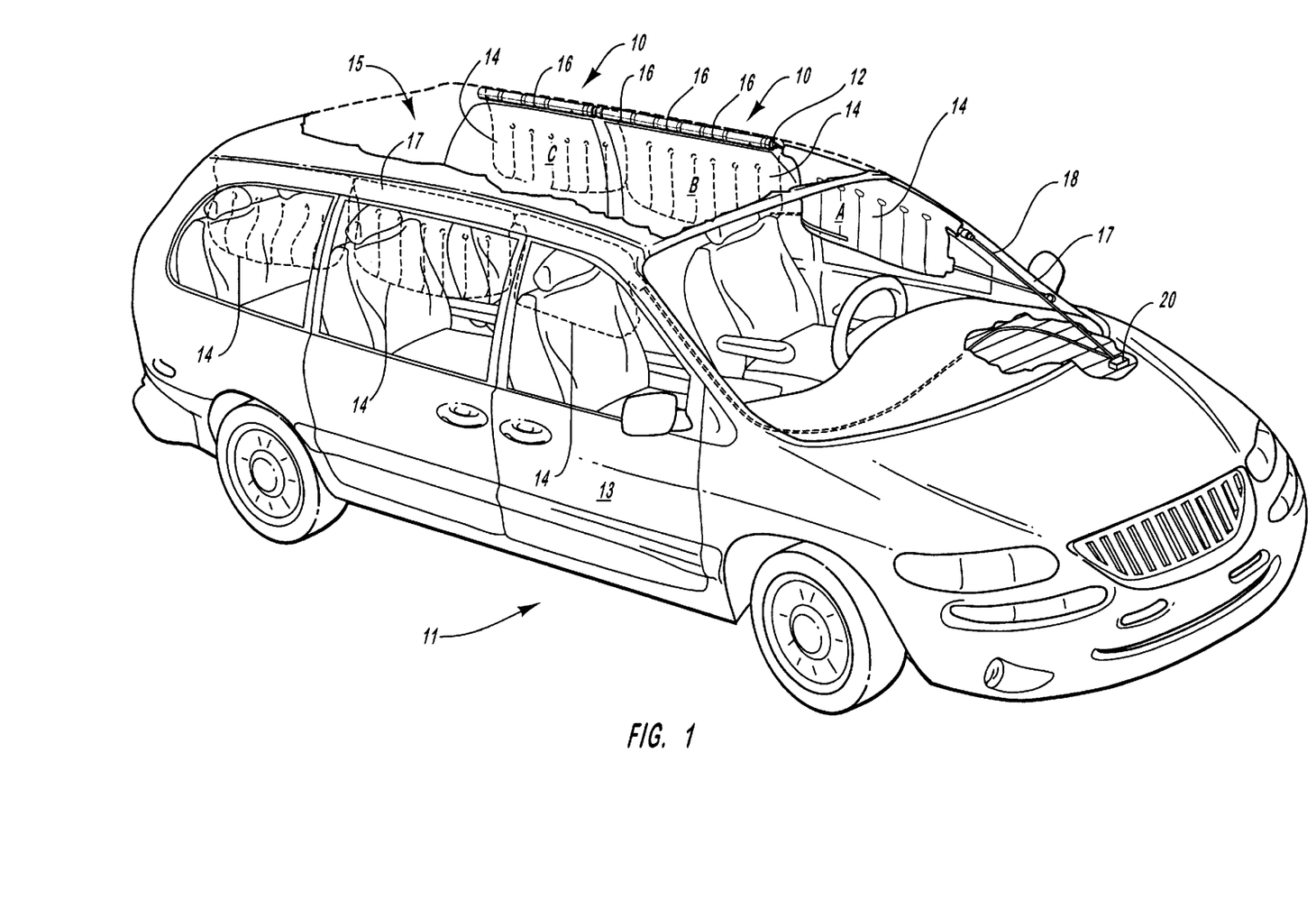
FIG. 1 is a perspective view illustrating within a vehicle where the curtain airbag apparatuses are generally installed.

FIG. 1 is a perspective view illustrating where curtain airbag apparatuses 10 are generally installed. FIG. 1 illustrates a conventional vehicle equipped with a plurality of curtain airbag apparatuses 10. The illustrated vehicle 11 is a van which has large windows 13 and side-walls. The larger windows 13 than those found in passenger cars increases the need for curtain airbag apparatuses. The van has door and window frames which connect the body of the vehicle 11 to the vehicle roof 15. The vehicle roof 15 includes a roof rail 17.

FIG. 1 also illustrates how the curtain airbag 14 deploys along an interior side of a vehicle 11. A curtain airbag inflation apparatus 10 is generally mounted behind an airbag cover (not shown) to the vehicle roof rail 17 between a side door/window 13 and the vehicle roof 15. Vehicles are generally designed to minimize the width of the vehicle roof rail 17 on the sides to provide improved visibility and aesthetic appeal for vehicle occupants. These designs limit the storage space for the curtain airbag 10. However, the curtain airbag 10 should still inflate to protect the occupant from impact with the vehicle's side interior.

A curtain airbag inflation apparatus 10 comprises an inflator 12. The inflator 12 provides gas to inflate a textile bag 14. Generally, gas is generated by a pyrotechnic combustion process within the inflator 12. The hot gas leaves the inflator 12 through exit ports 16 and enters the textile bag 14. The inflator 12 should produce enough gas to fully inflate the textile bag 14. The textile bag 14 is sized to occupy a volume of space between the occupant and the side of the vehicle when inflated. In order to provide sufficient gas to fully inflate the textile bag 14, the inflator 12 generally extends a significant portion of the length of the airbag inflation apparatus 10.

The inflator 12 is electronically connected by wiring 18 to the electronic control unit (ECU) 20. As mentioned above, the ECU 20 detects when the vehicle is in an accident and sends an electrical signal through wiring 18 to ignite gas generant within the inflator 12. The ignited gas generant creates inflation gas to fill the textile bag 14. Prior to inflation, the textile bag 14 is stored folded between an airbag cover (not shown) and the inflator 12.

The width of the roof rail 17 illustrates the long thin structure which secures the curtain airbag apparatus 10. The roof rail 17 connects the door and window frames to the roof and body of the vehicle. As mentioned above, the curtain airbag apparatus 10 mounts within the width and length of the roof rail 17.

Curtain airbag A illustrates a curtain airbag apparatus 10 installed along a curve in the roof rail 17. Conventionally, multiple inflators 12 may be installed on either side of the curve which results in added cost and complexity in installation. One embodiment of the present invention allows the inflator 12 to curve along the roof rail 17 without specially designed lengths of inflator 12 or multiple inflators 12. Curtain airbags B and C illustrate two textile airbags 14 which may be inflated using one inflator 12 according to one embodiment of the present invention. By inflating multiple textile airbags 14 the number of parts used is reduced. This generally reduces the cost and complexity of installing the curtain airbag apparatus 10.

Traditionally, inflators 12 are designed and fabricated according to specifications which are often unique to each vehicle. The varied sizes and shapes require changes to tooling machines which fabricate the inflators 12. This causes delays in the assembly process and increases the costs of fabrication.

Figure 2A:
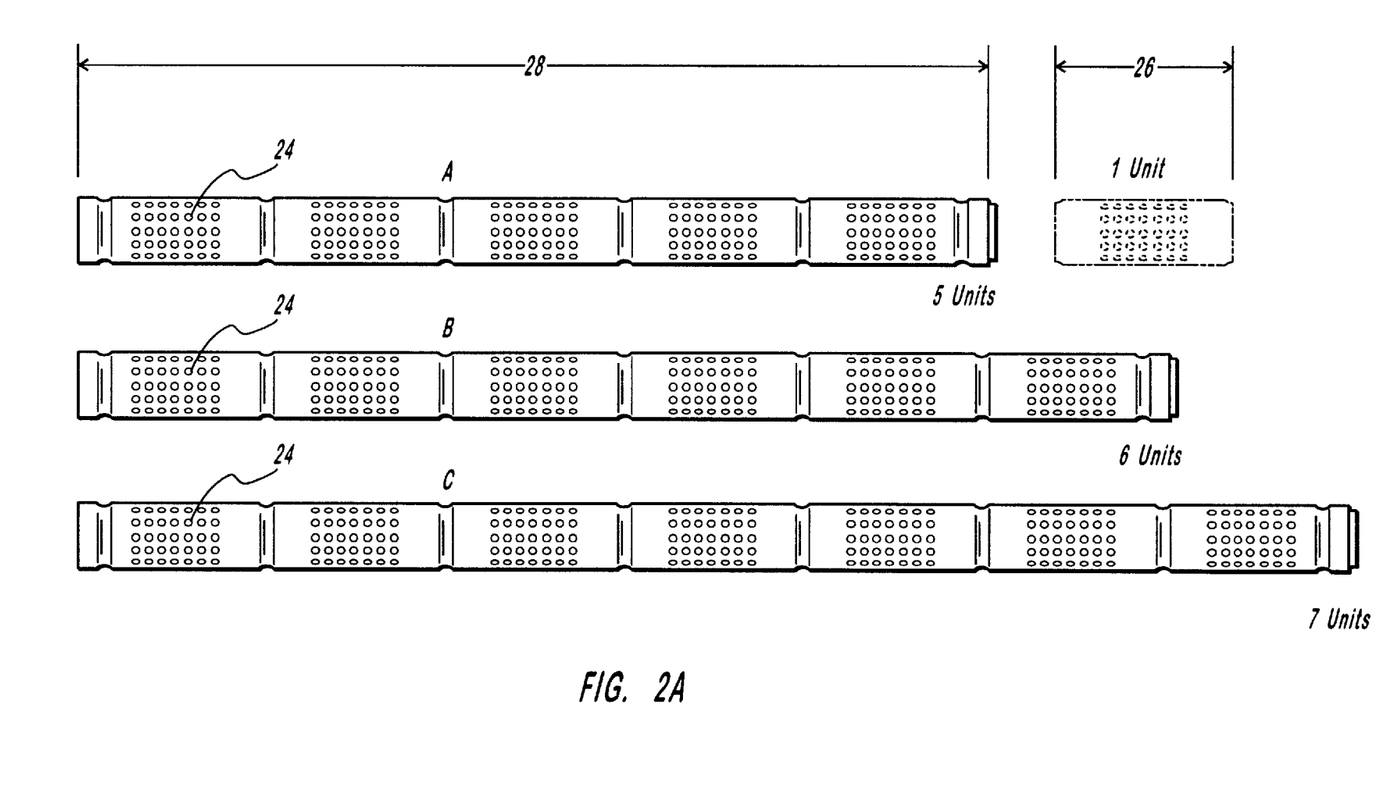
FIG. 2A is a perspective view illustrating modular curtain inflator sections.

FIG. 2A illustrates one embodiment of modular inflator sections 24 according to the present invention. The inflator sections 24 may be connected to function similar to conventional inflators 12. FIG. 2A illustrates three inflator sections 24 of different lengths. The lengths may be measured by the illustrated unit of measure 26. A unit of measure may be an inch, a foot, a centimeter, or other unit of measure. Alternatively, the unit of measure 26 may be of a varied length such as 11 inches, 15.2 inches and other like lengths. The unit of measure 26 is provided to illustrate the modular nature of the present invention. Alternative lengths or variations of sizes between a plurality of inflator sections 24 having varied units of measure 26 are contemplated within the scope of the present invention. FIG. 2A illustrates inflator sections 24 having respective units of measure 26 of 5 units, 6 units, and 7 units.

An inflator section 24 includes the necessary components to function as an inflator 12. Therefore, inflator sections 24 may be fabricated using techniques and machinery which is very similar to those used to fabricate inflators 12 of particular lengths. As mentioned above, inflators 12 are generally fabricated to different specific lengths determined by the make and/or model of the vehicle into which the inflator 12 will be installed. The fabrication machinery may need to be adjusted to produce the different specific lengths. Because inflators 12 are generally produced on an assembly line, stopping the assembly line to adjust the machines for a different sized inflator 12 is a waste of time and money.

In one embodiment, inflator sections 24 of a relatively few lengths may be fabricated using the same machinery as that used for different size inflators 12. Rather than fabricating an inflator section 24 for each make and/or model of vehicle, a comparatively few inflator section lengths are produced in mass. The assembly line which produces the inflator sections 24 may then be adjusted at a natural break, such as the end of the work day, to produce a second length of inflator section 24 in mass. In this manner, a plurality of inflator section lengths 28 may be produced very efficiently.

Figure 2B:
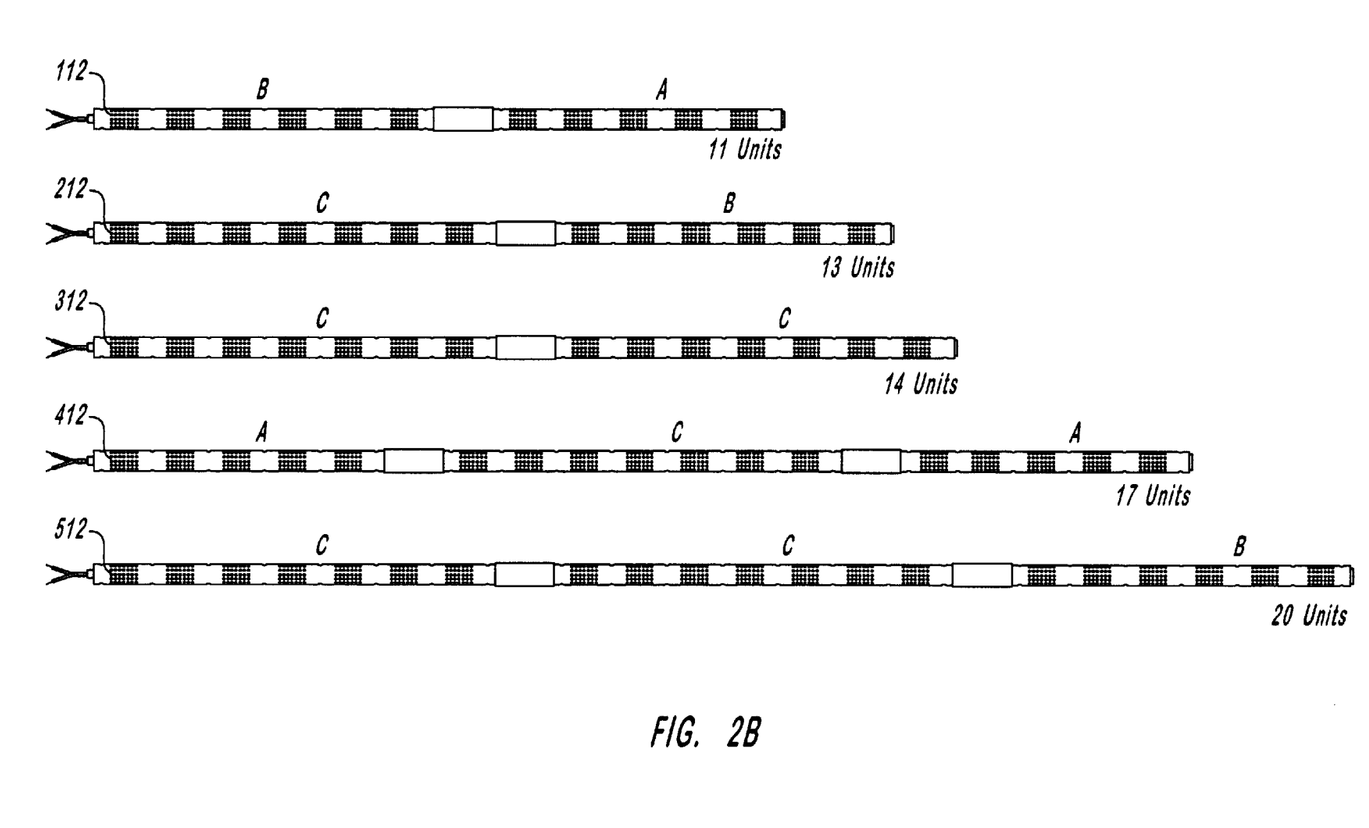
FIG. 2B is a perspective view illustrating various size curtain inflators which may be built from the modular curtain inflator sections in FIG. 2A.

Referring now to FIG. 2B, by connecting one inflator section 24 to another, an operable inflator 12 of various different lengths may be fabricated. FIG. 2B illustrates examples of different length inflators 112, 212, 312, 412, 512 which may be fabricated using the inflator sections 24 of the lengths illustrated in FIG. 2A.

For example, an inflator 112 measures eleven units 26. Inflator 112 may be made by connecting a first inflator section A 24 to a second inflator section A 24. Similarly, inflator 512 measures twenty units 26 and may be made using a first inflator section C 24, a second inflator section C 24, and a third inflator section B 24. Similarly, inflators 212, 312, and 412 may also be fabricated from a combination of the three inflator sections 24 illustrated in FIG. 2A.

One embodiment, allows for a relatively small set of inflator sections 24, as in FIG. 2A, to be mass produced and connected such that a relatively high number of inflators 112, 212, 312, 412, 512 may be fabricated. It is contemplated that the number of inflator sections 24 in FIG. 2A is not limited to those illustrated. The number of inflator sections 24 built to standard lengths may be as numerous or limited as inflator fabrication may require. Preferably, the number of standard size inflator sections 24 is minimal.

Figure 3A:
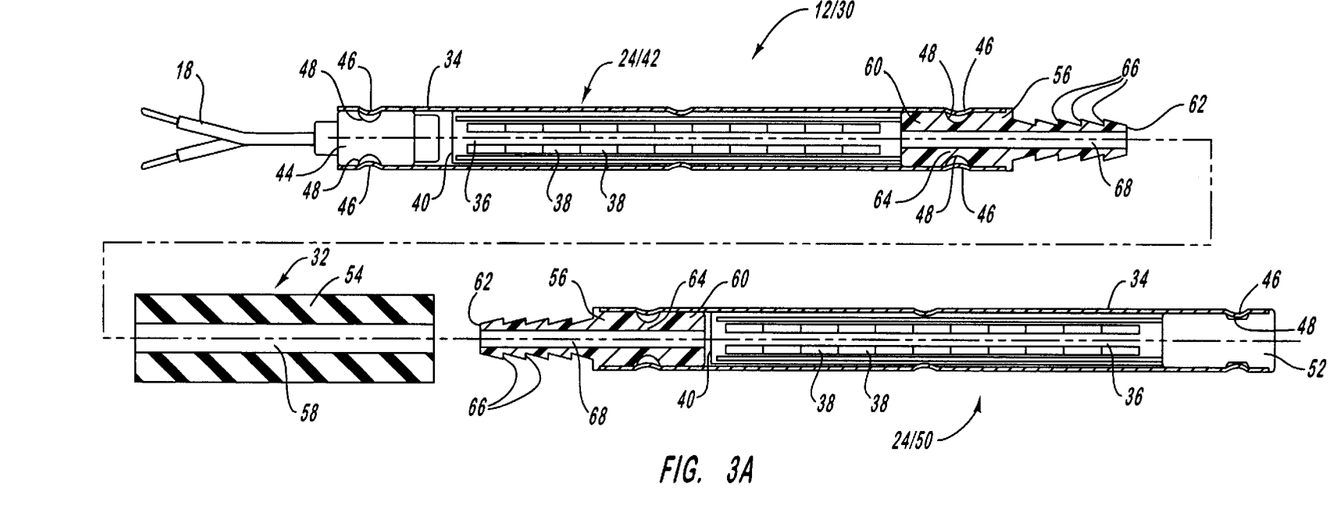
FIG. 3A is a cross-sectional view of a first inflator section connected to a second inflator section according to one embodiment of the present invention.

Referring now to FIG. 3A, a cross-section view of one embodiment of a modular airbag inflator 12, 30 is illustrated. Preferably, the modular airbag inflator 12, 30 comprises at least two inflator sections 24 which are connected by a connector assembly 32. Alternatively, two or more inflator sections 24 may be joined end to end, in series, to create a modular airbag inflator 12, 30 having one less connector assembly 32 than the number of inflator sections 24.

Inflator sections 24 provide structural support for the inflator 12, 30. Accordingly, an inflator section 24 includes a casing 34. The casing 34 is generally made of a rigid noncombustible material such as metal, ceramic or the like. The casing 34 also provides the general shape for the inflator 12, 30. Preferably, the casing 34 is shaped as a straight cylindrical tube. The length of the casing 34 extends from one end of the inflator section 24 to the other. The inflator section 24 is of a length as described in relation to FIGS. 2A and 2B. The casing 34 includes an internal gas passage way 36 that extends from one end of the casing 34 to the other.

The gas passage way 36 provides a combustion chamber for generating inflation gas used to inflate the airbag 14 (See FIG. 1). The passage way 36 also allows a shock wave of very hot inflation gas to travel from one end of an inflator section 24 to the other. The gas passage way 36 is generally cylindrical and sized to allow the inflation gas to travel the passage way 36 with few obstructions.

The passage way 36 houses gas generant 38. The gas generant 38 comprises a combustible material which creates inflation gas once ignited. The gas generant 38 is preferably disposed along the walls of the passage way 36. In one embodiment, the gas generant 38 is surrounded by a pouch 40. The pouch 40 may be made of Mylar or other similar materials which easily melt and/or combust.

Preferably, a first inflator section 24, 42 of the modular airbag inflator 12, 30 includes an initiator 44. The initiator 44 is electronically connected with wiring 18 to the ECU (not shown). The wiring 18 carries an electronic signal to ignite a pyrotechnic charge in the initiator 44. The hot particles, subsequently released from the initiator 44, ignite the gas generant 38.

The initiator 44 is preferably sized and shaped to fit securely within one end of the casing 34. Preferably, the initiator 44 is secured by bias between the casing 34 and the initiator 44 as well as a crimp 46 of the casing 34 around a groove 48 of the initiator 44. Alternatively, the initiator 44 may be secured by other techniques such as gluing, welding, a fastening screw, and the like.

Preferably the last inflator section 24, 50 of the modular airbag inflator 12, 30 includes a stop 52. The stop 52 is installed within the passage way 36 at the unconnected end of the last inflator section 24, 50. The stop 52 is preferably a rigid piece made from non-combustible material such as metal, ceramic, or the like. Preferably, the stop 52 is secured within the end of the inflator section 24 using a crimp 46 around a groove 48 formed in the stop 52. The stop 52 prevents inflation gas from escaping last inflator section 24, 50. The stop 52 allows inflation gas to build up within the passage way 36 until the pressure in the passage way 36 is high enough that the inflation gas escapes into a textile airbag 14 by way of the exit ports 16 (See FIG. 1).

Referring still to FIG. 3A, a connector assembly 32 is illustrated. In one embodiment, the connector assembly 32 includes a hose 54 and two connectors 56. Alternatively, the connector assembly 32 may comprise a hose 54 and the ends of the inflator sections 24 may be configured to secure the hose 54. Preferably, the hose 54 is hollow having a passage 58 substantially the same diameter as the gas passage 36 of an inflator section 24. Generally, the hose 54 is flexible. Alternatively, the hose 54 may be rigid. In one embodiment, the hose 54 is made of a flexible material such as rubber, pliable plastic, and the like. Alternatively, the hose 54 may be made from rigid material such as hard plastics, ceramic, metal, or the like.

The hose 54 provides a support structure to connect one inflator section 24 to another. The hose 54 should be capable of functioning in conditions of high heat and pressure such as that created by the inflation gas. Therefore, the hose 54 may comprise a composite rubber and plastic material, and nylon cords within a wall of the hose 54 to provide additional strength. In one embodiment, the hose 54 is made such that it receives a Society of Automotive Engineers (SAE) rating of 100R3.

The length of the hose 54 depends largely on the size and type of the inflator 12, 30. The hose 54 should be of a length such that inflation gas may successfully exit one inflator section 24 and ignite gas generant 38 within a subsequent inflator section 24. Generally, the hose 54 is about 2–3 inches in length.

The depicted connector assembly 32 further includes two connectors 56. A connector 56 securely connects an inflator section 24 to the hose 54. In one embodiment, a first connector 56 secures an end of a first inflator section 24, 42 to an end of the hose 54. A second connector 56 secures an end of a second inflator section 24, 50 to the other end of the hose 54.

Preferably, a connector 56 is made from a rigid material capable of withstanding a large amount of stress, such as metal, ceramic, wood, or the like. A connector 56 comprises a first end 60 and a second end 62. The first end 60 is secured within an end of an inflator section 24. Securement of the first end 60 to the end of the inflator section 24 is preferably accomplished in the substantially same manner used to secure an initiator 44 and/or stop 52 to an end of an inflator section 24. For example, a crimp 46 may be made in the casing 34 around a neck 64 of the connector 56 into a groove 48 to secure the first end 60 within an end of an inflator section 24. Alternatively, other securement techniques such as glue, or welding may be used.

The second end 62 is secured to the hose 54. Preferably, the second end 62 includes a plurality of barbs 66 which protrude from the side of the connector 56 preferably toward the first end 60. Barbs 66 may be formed by removing material from the second end 62 such that a point is created. In this manner, a one-way barb 66 is created.

Connectors 56 having a plurality of barbs 66 may be referred to as barb connectors 56. The one-way barb 66 allows the hose 54 to slip relatively easily over the second end 62 of the connector 56. However, the one-way barb 66 makes removing the hose 54 significantly more difficult. A one-way barb 66 allows the hose 54 to move easily in one direction but not in the reverse direction. Generally, the barb 66 may not be removed without damaging the hose 54 and/or the connector 56. In this way, the plurality of barbs 66 operably secure the hose 54 to the connector 56.

Between the first end 60 and second end 62, the connector 56 includes a connector passage 68. A connector passage 68 allows inflation gas to pass from the first end 60 to the second end 62. Generally, the connector passage 68 is of a diameter substantially similar to the diameter of the inflator section 24. Preferably, the connector passage 68 has a diameter that allows the connector 56 to maintain its rigid structural integrity.

Referring still to FIG. 3A, assembly of a modular airbag inflator 12, 30 according to a preferred embodiment is intuitive. First, a first standard size inflator section 24, 42 is provided having gas generant 38 disposed within the internal gas passage way 36. An initiator 44 is inserted in one end of the first inflator section 24, 42. The initiator 44 is secured by a crimp 46 formed in the casing 34 around the initiator 44. Next, the first end 60 of a first connector 56 is secured to the other end of the first inflator section 24, 42 by a crimp 46 in the casing 34. Then, one end of a hose 54 slips over the second end 62 of the first connector 56. A plurality of barbs 66 on the second end 62 prevent easy removal of the hose 54. The second end 62 of a second connector 56 is then inserted in the other end of the hose 54. Similarly, the barbs 66 of the second connector 56 secure it within the hose 54. The first end 60 of the second connector 56 is then secured by a crimp 46 to one end of a second inflator section 24. In FIG. 3A, the second inflator section 24 is also the last inflator section 24, 50.

At this point in the assembly process the modular inflator 12, 30 may be the proper length. If the modular inflator 12, 30 is the proper length, then a stop 52 may be secured to the other end of the second inflator section 24, 50 by a crimp 46. The modular inflator 12, 30 is then fully assembled. If the modular inflator 12, 30 is not yet the proper length, then one or more standard size inflator sections 24 may be connected to the other end of the second inflator section 24 in series using a connector assembly 32 between each pair of inflator sections 24. Once the last inflator section 24, 50 is connected, a stop 52 may be secured to the unconnected end as described above. In this manner, a plurality of different modular inflators 12, 30 may be assembled from a relatively small set of standard size inflator sections 24 and connector assemblies 32.

Modular inflators 12, 30 function in a similar fashion to conventional inflators 12. The electronic control unit (ECU) 20 (See FIG. 1) sends an electronic signal to the initiator 44. The initiator 44 ignites gas generant 38 within the internal gas passage way 36. The gas generant 38 combusts which creates a shock wave of very hot inflation gas. The gas generant 38 closest to the initiator 44 causes adjoining gas generant 38 within the gas passage way 36 to ignite. Because the initiator seals one end of the gas passage way 36, the inflation gas travels to the other end of the first inflator section 24, 42.

Then, the inflation gas travels through a first connector passage 68 to the hose passage 58. As mentioned above, the hose 54 maybe of various lengths. Therefore, in one embodiment, the hose 54 may include ignition enhancer (not shown) disposed within the hose passage 58. Generally, ignition enhancer is a combustible material which aids the inflation gas in maintaining sufficient heat and velocity to ignite gas generant 38 disposed in subsequent inflator sections 24.

From the hose passage 58, the inflation gas travels through the connector passage 68 of a second connector 56. Then, the inflation gas enters the gas passage way 36 of a connected second inflator section 24, 50. The second inflator section 24, 50 may include ignition enhancer disposed near the second connector 56 within the gas passage way 36.

If the modular inflator 12, 30 includes more than two connected inflator sections 24 then the inflation gas travels in series from one section 24 to the next until the gas enters the last section 24. In the last section 24, the inflation gas travels to the end and encounters the stop 52. The stop 52 causes the inflation gas to build up and pressurize within the gas passage 36. The inflation gas is then forced to exit the gas passage 36 through the exit ports 16 (See FIG. 1) disposed along the casing 34 of the inflator sections 24. From the exit ports 16 the inflation gas fills the textile airbag 14 (See FIG. 1).

Figure 3B:
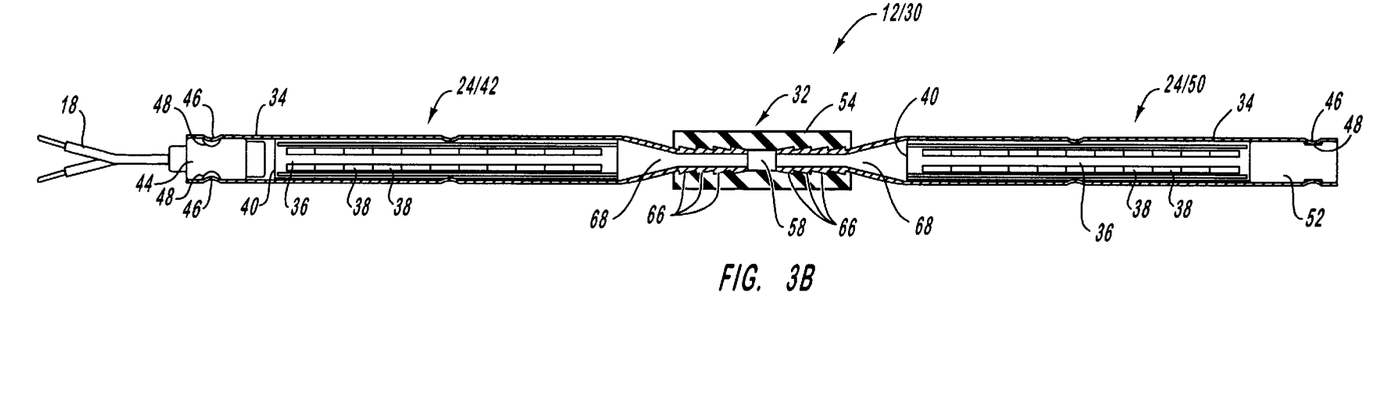
FIG. 3B is a cross-sectional view of a first inflator section connected to a second inflator section according to another embodiment of the present invention.

Referring now to FIG. 3B, a cross-section view of an alternative embodiment of a modular airbag inflator 12, 30 is illustrated. While embodiments using connectors 56 such as those described in relation to FIG. 3A are emphasized, it is contemplated that the present invention include embodiments which include no connectors 56. These other embodiments may secure the hose 54 to the ends of inflator sections 24 using other securement techniques.

In FIG. 3B, structures that form the connectors 56 in FIG. 3A are incorporated into the casing 34 of the inflator sections 24. The ends of the inflator sections 24 connected by the hose 54 may taper and include a plurality of barbs 66. The tapering allows the hose 54 to more easily slide over the end. The barbs 66 may be oriented to provide a one-way engagement of the hose 54 as with the connectors 56 discussed above.

Alternatively, the ends of the inflator sections 24 may include ribs (not shown) or other structures to facilitate securing the ends of the inflator sections 24 within the hose 54. Additionally, other securement techniques may be used including gluing, welding, and the like. These and other securement techniques are contemplated within the scope of the present invention.

Figure 4:
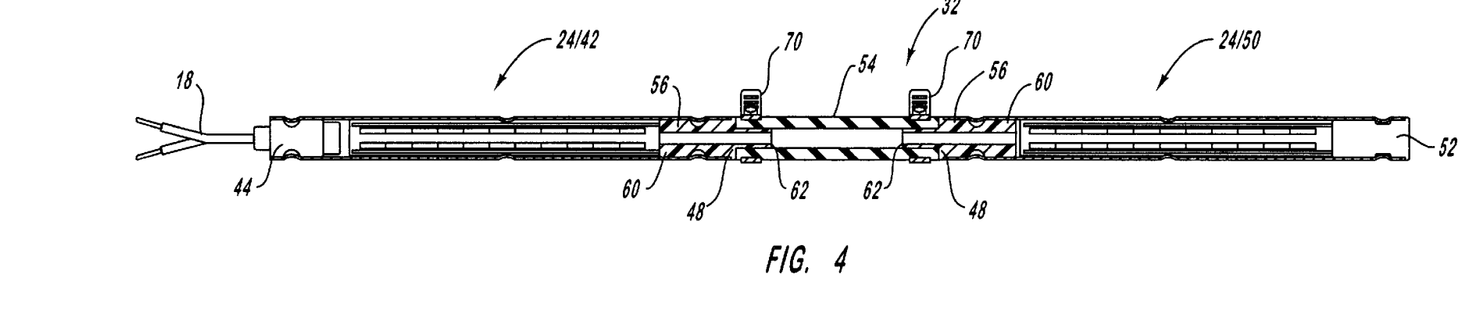
FIG. 4 is a cross-sectional view illustrating an alternative embodiment of a first inflator section connected to a second inflator section.

Referring now to FIG. 4, an alternative embodiment of a connector assembly 32 is illustrated. The connector assembly 32 includes a hose 54 and two connectors 56. Preferably, the hose 54 is made of flexible material such as rubber, flexible plastic, and the like. The connectors 56 are preferably made of the same material as that discussed in relation to FIG. 3A.

In the illustrated embodiment, the second ends 62 of connectors 56 are configured in a manner similar to the first ends 60 of connectors 56. The second ends 62 may include a groove 48. In this embodiment, a hose clamp 70 may be positioned around the hose 54. The hose clamp 70 may bias the hose 54 within the groove 48 of a second end 62 of one of the connectors 56. Similarly, a second hose clamp 70 may secure the second end 62 of a second connector 56 to the other end of the hose 54.

Preferably, the hose clamp 70 is a spring hose clamp 70 made of metal to allow the hose clamp 70 to maintain a bias for an extended period of time. Spring hose clamps 70 are well known. Generally, a spring hose clamp 70 is a piece of heat treated metal that is bent to form a circle having a diameter smaller than that of the hose 54. Two ends of the hose clamp 70 are forced apart when the hose clamp 70 is installed around the hose 54. When the ends of the hose clamp 70 are released, the hose clamp 70 springs shut to bias the hose 54 to the groove 48. Alternatively, other types of hose clamps 70 may be used. For example, two ends of a hose clamp 70 may bias the hose 54 using a screw (not shown) which may be tightened during installation.

Figure 5:
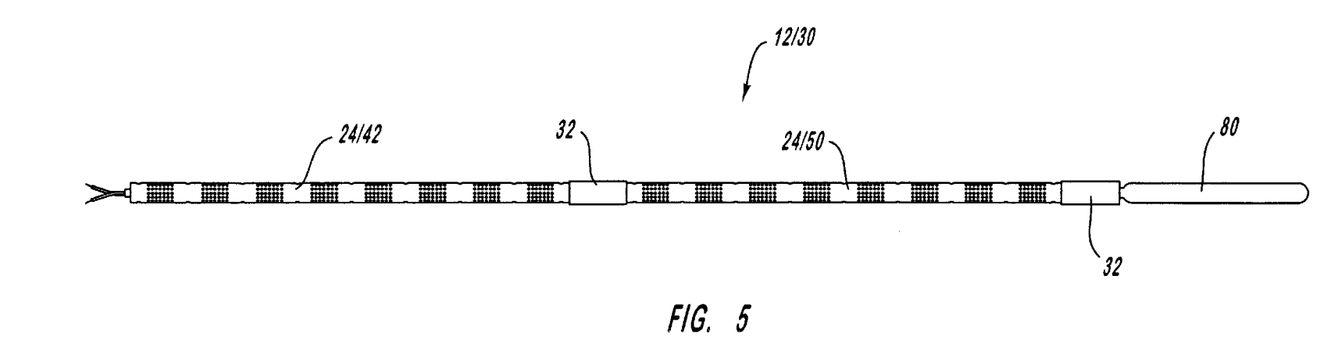
FIG. 5 is a perspective view illustrating a modular curtain inflator connected to a supplemental inflator.

Referring now to FIG. 5, a modular airbag inflator 30 connected to a supplemental inflation system 80 is illustrated. Once, a modular airbag inflator 30 is activated, the textile airbag 14 (See FIG. 1) inflates. However, the textile airbag 14 of most curtain airbag apparatuses 10 (See FIG. 1) release some of the inflation gas. Generally, the release of inflation gas occurs because the material used for the textile airbag 14 is semi-porous.

Generally, a vehicle accident lasts less than a second. Therefore, release of the inflation gas is generally not a problem. However, a vehicle may be involved in subsequent collisions, or may roll over repeatedly. In these cases, it is desirable that the airbag 14 remain inflated until the accident ends. A supplemental Inflation System (SIS) 80 has been developed to serve this need. Generally, an SIS 80 is an airbag inflation system which is triggered subsequent to the main airbag inflator 30, 12. The SIS 80 provides additional inflation gas to compensate for inflation gas lost through the airbag 14. An SIS 80 may simply comprise a supplemental inflator or may involve a more complicated system. Generally, an SIS 80 comprises a container of compressed gas. Preferably, the compressed gas is released at a rate comparable to the rate of release (leakage) of gas from the curtain airbag such that the curtain airbag remains full throughout a subsequent collision or rollover.

In FIG. 5, one embodiment of the present invention allows for easy attachment of an SIS 80 to the last inflator section 24, 50. Preferably, a connector assembly 32 such as that illustrated in FIG. 4 connects the inflator section 24 to the SIS 80. Referring generally to FIGS. 4 and 5, one end of the SIS 80 may be secured to a first end 60 of a first connector 56 using a crimp 46. The second end 62 of the first connector 56 may include barbs 66. The second end 62 is placed within one end of the hose 54. A second end 62 of a second connector 56 may be inserted into the other end of the hose 54. The first end 60 of the second connector 56 is then secured by a crimp 46 in one end of the last inflator section 24, 50.

In a like manner, connector assemblies 32 may connect one or more middle inflator sections 24 together. Alternatively, the modular inflator 12, 30 may simply include the first inflator section 24, 42 and an SIS 80. The flexibility provided by the connector assemblies 32 allows assembly of modular inflators 12, 30 of different sizes because the inflator sections 24 may be of different standard sizes.

Referring still to FIG. 5, opposite the SIS 80, the inflator sections 24 are connected in series until the desired length will be reached by adding the first inflator section 24, 42. The first inflator section 24, 42 comprises the initiator 44. Once the first inflator section 24, 42 is connected the modular inflator 30 is prepared for installation in the curtain airbag apparatus 10.

Generally, the SIS 80 is triggered by inflation gas from the inflator 12, 30. Preferably, the inflation gas travels through the gas passage way 36 (See FIG. 3A) from the first inflator section 24, 42 to subsequent inflator sections 24. When the inflation gas reaches the end of the last inflator section 24, 50, the force of the inflation gas preferably forces a pin (not shown) to puncture a canister (not shown) of compressed gas within the SIS 80. Alternatively, the SIS 80 may include a combustible material which is ignited by the inflation gas. The combustible material may then create an opening to release the gas within the canister.

Figure 6:
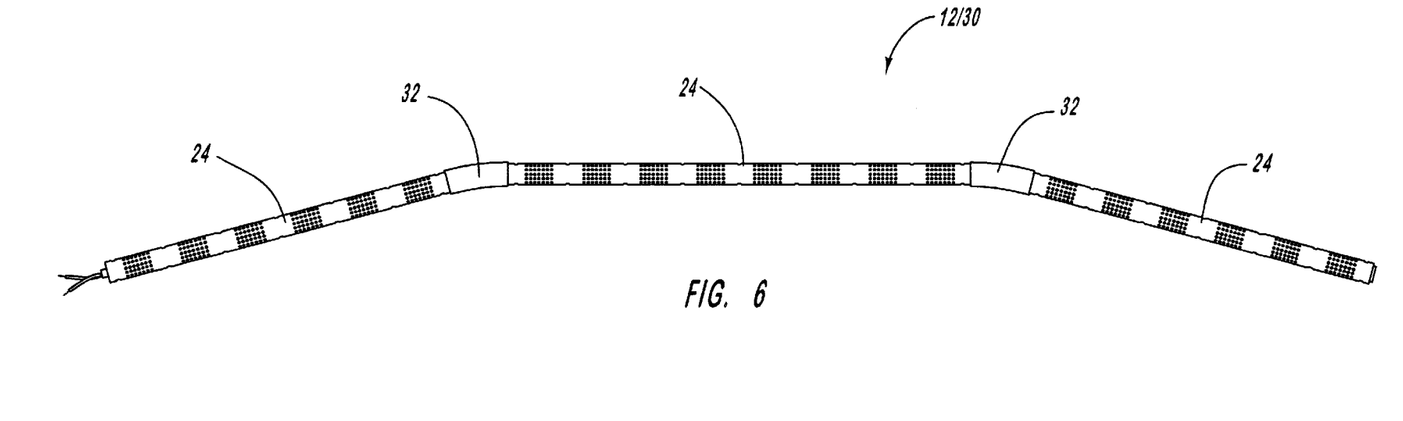
FIG. 6 is a perspective view illustrating a modular curtain inflator capable of bending according to one embodiment of the present invention.

Referring now to FIG. 6, an assembled modular inflator 12, 30 is illustrated. The modular inflator 12, 30 may be assembled using different lengths of standard size inflator sections 24. The modular inflator 12, 30 includes connector assemblies 32. Generally, inflator sections 24 are rigid. The rigidity ensures that the inflation gas travels properly through the gas passage way 36 (See FIG. 3A) to ignite subsequent inflator sections 24. Preferably, the assemblies 32 comprise a flexible hose 54. The flexible hose 54 allows the modular inflator 12, 30 to bend at the points where the connector assemblies 32 are installed. In FIG. 6, the two connector assemblies 32 are bent to illustrate the flexibility of the hoses 54.

As mentioned above, hose 54 may be of variable lengths. Depending on the length of the hose 54 ignition enhancer may be disposed within the hose 54 to aid the inflation gas in traveling through the hose 54. Generally, the longer the hose 54 is, the more flexible the connector assembly 32 is. The hose 54 flexibility and length allows the inflator 12, 30 to be installed in a curtain airbag apparatus 10 that is installed along a roof rail 17 (See FIG. 1) having a curved contour. Additionally, the flexibility of the hose 54 may allow one modular inflator 12, 30 to be installed such that the hose 54 connects an inflator section 24 on either side of a corner of a roof rail 17.

Preferably, a modular inflator 12, 30, as in FIG. 6, may be bent no further than the point at which a kink is formed in the hose 54. A kink may cause the diameter of the gas passage way 36 to be restricted. This may cause the inflation gas to become obstructed within the gas passage way 36.

Referring now indirectly to FIGS. 1–6, a modular inflator 12, 30 is provided. The modular inflator 12, 30 may be assembled from a plurality of inflator section lengths 28. The lengths 28 may be standardized. However, a plurality of different size inflators 12, 30 may be assembled from these lengths. The modular inflator 12, 30 includes connection assemblies 32 which preferably allow the inflator 12, 30 to bend to allow installation in a curved contour roof rail 17. In one embodiment, the inflator 30 includes a Supplemental Inflation System (SIS) 80 attached to the end of the last inflator section 24, 50. By way of the standard inflation section lengths 28, connector assemblies 32, and attachment of the SIS 80 an operable and useful modular inflator 12, 30 may be provided.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A modular airbag inflation system, comprising:
   a first inflator section;
   a second inflator section connected at one end by a flexible hose to an end of the first inflator section;
   wherein a heated gas traveling through the first inflator section is capable of passing through the hose to ignite gas generant within the second inflator section.

2. A modular airbag inflation system as in claim 1, wherein the first inflator section comprises an initiator secured within an unconnected end.

3. A modular airbag inflation system as in claim 1, wherein the second inflator section comprises a stop secured within an unconnected end.

4. A modular airbag inflation system as in claim 1, wherein the first inflator section and second inflator section are substantially cylindrical.

5. A modular airbag inflation system as in claim 1, wherein a plurality of inflator sections are connected in series with a flexible hose connecting each inflator section to the next inflator section in the series.

6. A modular airbag inflation system as in claim 1, wherein ends of the first inflator section and second inflator section that connect to the flexible hose comprise a plurality of barbs.

7. A modular airbag inflation system, comprising:
   at least two inflator sections;
   at least one flexible hose capable of securing an inflator section to an end of the hose;
   wherein the inflator sections are secured to each other by the hose.

8. A modular airbag inflation system as in claim 7, wherein each end of the hose is secured to an inflator section by a connector.

9. A modular airbag inflation system as in claim 7, wherein one inflator section comprises an initiator.

10. A modular airbag inflation system as in claim 7, wherein the inflator sections are substantially cylindrical.

11. A modular airbag inflation system as in claim 7, wherein a gas generant is disposed within the inflator sections.

12. A modular airbag inflation system as in claim 7, wherein one inflator section comprises an ignition enhancer.

13. A modular airbag inflation system as in claim 7, wherein the inflator sections are connected in a series with one hose and two connectors connecting each inflator section to the next inflator section.

14. A modular airbag inflation system as in claim 13, wherein the inflator sections, flexible hoses, and connectors further comprise an internal gas passage way to allow a heated gas to travel from a first inflator section, through each hose and connector and such that gas generant is ignited within each trailing inflator section until a last inflator section is ignited.

15. A modular airbag inflation system as in claim 14, wherein the last inflator section is attached to a supplemental inflator.

16. A modular airbag inflation system as in claim 14, wherein each connector comprises a barb connector.

17. A modular airbag inflation system as in claim 14, wherein each connector comprises a rigid tube with a hose clamp which secures the hose to the rigid tube.

18. An airbag inflator section connection assembly, comprising:
    a flexible hose;
    two connectors, each connector being secured within an end of the hose; and
    wherein the connectors are configured to receive and secure an end of an airbag inflator section.

19. An airbag inflator section connection assembly as in claim 18, wherein the connectors comprise a plurality of barbs disposed on one end, the plurality of barbs being configured to allow easy insertion of a connector within the hose and resist removal of a connector from the hose.

20. An airbag inflator section connection assembly as in claim 18, wherein the connectors comprise a neck configured with a groove to allow a casing of an inflator section surrounding the neck to engage the groove when crimped.

21. An airbag inflator section connection assembly as in claim 18, further comprising ignition enhancer disposed within the hose to assist a heated gas in traveling from one end of the hose to the other.

22. An airbag inflator section connection assembly as in claim 18, wherein the hose is made of rubber.

23. An airbag inflator section connection assembly as in claim 18, wherein the hose is cylindrical in shape.

24. A curtain airbag inflator system comprising:
    a flexible hose;
    a first connector secured at one end of the hose and a second connector secured at the other end of the hose;
    a first inflator section secured at one end to the first connector and a second inflator section secured at one end to the second connector;
    wherein a heated gas traveling through the first inflator section is capable of passing through the first connector, the hose, and through the second connector to ignite gas generant within the second inflator section.

25. A curtain airbag inflator system as in claim 24, wherein the first inflator section comprises an initiator secured within an unconnected end.

26. A curtain airbag inflator system as in claim 24, wherein the second inflator section comprises a stop secured within an unconnected end.

27. A curtain airbag inflator system as in claim 24, wherein the first inflator section and second inflator section are substantially cylindrical.

28. A method for manufacturing a modular curtain airbag inflator system, comprising:
    providing a first inflator section having a length chosen from a set of at least two different lengths and a proximal end having an initiator disposed therein;
    crimping a distal end of the first inflator section to a neck of a first connector;
    inserting a barbed end of the first connector within an end of a flexible tube;
    inserting a barbed end of a second connector within the other end of the flexible tube; and
    crimping a proximal end of a second inflator section to the neck of the second connector, the second inflator having a length chosen from the set of at least two different lengths and configured with a stop closing a distal end of the second inflator section.

29. A method as in claim 28, wherein the first inflator section and second inflator section are cylindrical.

* * * * *